(12) United States Patent
Calman et al.

(10) Patent No.: US 8,718,612 B2
(45) Date of Patent: May 6, 2014

(54) REAL-TIME ANALYSIS INVOLVING REAL ESTATE LISTINGS

(75) Inventors: Matthew A. Calman, Charlotte, NC (US); Erik Stephen Ross, Charlotte, NC (US); Alfred Hamilton, Charlotte, NC (US)

(73) Assignee: Bank of American Corporation, Charlotte, NC (US)

( * ) Notice: Subject to any disclaimer, the term of this patent is extended or adjusted under 35 U.S.C. 154(b) by 74 days.

(21) Appl. No.: 13/342,045

(22) Filed: Jan. 1, 2012

(65) Prior Publication Data

US 2012/0231814 A1  Sep. 13, 2012

Related U.S. Application Data

(60) Provisional application No. 61/478,399, filed on Apr. 22, 2011, provisional application No. 61/450,213, filed on Mar. 8, 2011.

(51) Int. Cl.
*H04M 3/42* (2006.01)
*H04M 1/725* (2006.01)
*H04W 24/00* (2009.01)
*G06Q 50/00* (2012.01)

(52) U.S. Cl.
USPC .................. 455/414.1; 455/412.2; 455/456.3; 455/457; 705/313

(58) Field of Classification Search
USPC ............. 455/456.3, 412.1, 412.2, 414.1, 457; 705/313
See application file for complete search history.

(56) References Cited

U.S. PATENT DOCUMENTS

| | | |
|---|---|---|
| 5,768,633 A | 6/1998 | Allen et al. |
| 6,202,055 B1 | 3/2001 | Houvener et al. |
| 6,522,772 B1 | 2/2003 | Morrison et al. |
| 6,533,392 B1 | 3/2003 | Koitabashi |
| 6,636,249 B1 | 10/2003 | Rekimoto |
| 6,674,993 B1 | 1/2004 | Tarbouriech |
| 6,856,965 B1 | 2/2005 | Stinson et al. |
| 7,016,532 B2 | 3/2006 | Boncyk et al. |

(Continued)

FOREIGN PATENT DOCUMENTS

| | | |
|---|---|---|
| JP | 2007-266143 | 10/2007 |
| KR | 1020090047614 A | 5/2009 |
| KR | 1020090105734 A | 10/2009 |

OTHER PUBLICATIONS

International Search Report and Written Opinion for International Application No. PCT/US12/27890 mailed Feb. 5, 2013.

(Continued)

*Primary Examiner* — Christopher M Brandt
(74) *Attorney, Agent, or Firm* — Michael A. Springs; Moore & Van Allen PLLC; F. Emmett Weindruch

(57) ABSTRACT

In general terms, embodiments of the present invention relate to apparatuses, methods, and computer program products for presenting information associated with a real estate listing in an augmented reality environment. For example, in some embodiments, a method is provided that includes (a) receiving positioning information from a mobile device; (b) identifying, based at least partially on the positioning information, a real estate property; (c) determining that the real estate property is subject to a real estate listing; and (d) presenting, via the mobile device, information that indicates that the real estate property is subject to a real estate listing.

48 Claims, 7 Drawing Sheets

(56) References Cited

U.S. PATENT DOCUMENTS

| | | | |
|---|---|---|---|
| 7,062,454 | B1 | 6/2006 | Giannini et al. |
| 7,110,964 | B2 | 9/2006 | Tengler et al. |
| 7,154,529 | B2 | 12/2006 | Hoke et al. |
| 7,155,228 | B2 | 12/2006 | Rappaport et al. |
| 7,309,015 | B2 | 12/2007 | Frantz et al. |
| 7,403,652 | B2 | 7/2008 | Boncyk et al. |
| 7,412,081 | B2 | 8/2008 | Doi |
| 7,424,303 | B2 | 9/2008 | Al-Sarawi |
| 7,477,780 | B2 | 1/2009 | Boncyk et al. |
| 7,526,280 | B2 | 4/2009 | Jung et al. |
| 7,564,469 | B2 | 7/2009 | Cohen |
| 7,565,008 | B2 | 7/2009 | Boncyk et al. |
| 7,615,446 | B2 | 11/2009 | Kim et al. |
| 7,634,448 | B1 | 12/2009 | Ramachandran |
| 7,680,324 | B2 | 3/2010 | Boncyk et al. |
| 7,693,585 | B2 | 4/2010 | Kalan et al. |
| 7,735,728 | B2 | 6/2010 | Wallerstorfer |
| 7,775,437 | B2 | 8/2010 | Cohen |
| 7,792,738 | B2 | 9/2010 | Channell |
| 7,840,031 | B2 | 11/2010 | Albertson et al. |
| 7,881,243 | B2 | 2/2011 | Hardy et al. |
| 7,881,529 | B2 | 2/2011 | Boncyk et al. |
| 7,899,243 | B2 | 3/2011 | Boncyk et al. |
| 7,899,252 | B2 | 3/2011 | Boncyk et al. |
| 7,962,128 | B2 | 6/2011 | Neven et al. |
| 7,970,649 | B2 | 6/2011 | Wu |
| 7,983,971 | B1 | 7/2011 | McLuckie et al. |
| 7,988,060 | B2 | 8/2011 | Killian et al. |
| 8,121,944 | B2 | 2/2012 | Norman et al. |
| 8,138,930 | B1 | 3/2012 | Heath |
| 8,145,594 | B2 | 3/2012 | Geisner et al. |
| 8,154,428 | B2 | 4/2012 | Do et al. |
| 8,180,377 | B2 | 5/2012 | Yang et al. |
| 8,233,673 | B2 | 7/2012 | Britz et al. |
| 8,385,971 | B2 | 2/2013 | Rhoads et al. |
| 8,392,450 | B2 | 3/2013 | Blanchflower et al. |
| 8,438,110 | B2 | 5/2013 | Calman et al. |
| 8,571,888 | B2 | 10/2013 | Calman et al. |
| 2002/0029386 | A1* | 3/2002 | Robbins .................. 725/56 |
| 2002/0124188 | A1 | 9/2002 | Sherman et al. |
| 2003/0064705 | A1* | 4/2003 | Desiderio .................. 455/412 |
| 2004/0021584 | A1* | 2/2004 | Hartz et al. .............. 340/995.24 |
| 2004/0024709 | A1 | 2/2004 | Yu et al. |
| 2004/0068751 | A1* | 4/2004 | Basawapatna et al. ....... 725/117 |
| 2005/0162523 | A1 | 7/2005 | Darrell et al. |
| 2006/0100951 | A1 | 5/2006 | Mylet et al. |
| 2007/0140595 | A1 | 6/2007 | Taylor et al. |
| 2007/0162971 | A1 | 7/2007 | Blom et al. |
| 2007/0240186 | A1* | 10/2007 | Silver et al. .................. 725/39 |
| 2007/0279521 | A1 | 12/2007 | Cohen |
| 2008/0040278 | A1 | 2/2008 | DeWitt |
| 2008/0070198 | A1 | 3/2008 | Dempsey |
| 2008/0214210 | A1 | 9/2008 | Rasanen et al. |
| 2008/0243721 | A1 | 10/2008 | Joao |
| 2008/0267447 | A1 | 10/2008 | Kelusky et al. |
| 2008/0268876 | A1 | 10/2008 | Gelfand et al. |
| 2009/0006191 | A1 | 1/2009 | Arankalle et al. |
| 2009/0061949 | A1 | 3/2009 | Chen |
| 2009/0089131 | A1 | 4/2009 | Moukas et al. |
| 2009/0094125 | A1 | 4/2009 | Killian et al. |
| 2009/0102859 | A1 | 4/2009 | Athsani et al. |
| 2009/0121271 | A1 | 5/2009 | Son et al. |
| 2009/0140839 | A1 | 6/2009 | Bishop et al. |
| 2009/0144164 | A1 | 6/2009 | Wane et al. |
| 2009/0171850 | A1 | 7/2009 | Yuval |
| 2009/0182748 | A1* | 7/2009 | Walker .................. 707/10 |
| 2009/0204511 | A1 | 8/2009 | Tsang |
| 2009/0237546 | A1 | 9/2009 | Bloebaum et al. |
| 2009/0250515 | A1 | 10/2009 | Todd et al. |
| 2009/0251963 | A1 | 10/2009 | Seol et al. |
| 2010/0002204 | A1 | 1/2010 | Jung et al. |
| 2010/0103241 | A1* | 4/2010 | Linaker .................. 348/14.02 |
| 2010/0130226 | A1 | 5/2010 | Arrasvuori et al. |
| 2010/0185529 | A1 | 7/2010 | Chesnut et al. |
| 2010/0228776 | A1 | 9/2010 | Melkote et al. |
| 2010/0250581 | A1 | 9/2010 | Chau |
| 2010/0255795 | A1 | 10/2010 | Rubinsky et al. |
| 2010/0277412 | A1 | 11/2010 | Pryor |
| 2010/0281432 | A1 | 11/2010 | Geisner et al. |
| 2010/0306712 | A1 | 12/2010 | Snook et al. |
| 2010/0306715 | A1 | 12/2010 | Geisner et al. |
| 2011/0022540 | A1* | 1/2011 | Stern et al. .................. 705/36 R |
| 2011/0034176 | A1 | 2/2011 | Lord et al. |
| 2011/0077046 | A1 | 3/2011 | Durand et al. |
| 2011/0079639 | A1 | 4/2011 | Khan |
| 2011/0106622 | A1 | 5/2011 | Kuhlman et al. |
| 2011/0119155 | A1 | 5/2011 | Hammad et al. |
| 2011/0202460 | A1 | 8/2011 | Buer et al. |
| 2011/0202466 | A1 | 8/2011 | Carter |
| 2012/0100915 | A1 | 4/2012 | Margalit et al. |
| 2012/0330753 | A1 | 12/2012 | Urbanski et al. |
| 2013/0011111 | A1 | 1/2013 | Abraham et al. |

OTHER PUBLICATIONS

International Searching Authority. PCT International Search Report and Written Opinion dated May 28, 2012. PCT International Application No. PCT/US12/28036. Name of Applicant: Bank of America Corporation. English Language. 11 pages.

International Searching Authority. PCT International Search Report and Written Opinion dated May 22, 2012. PCT International Application No. PCT/US12/28008. Name of Applicant: Bank of America Corporation. English Language. 13 pages.

International Searching Authority. PCT International Search Report and Written Opinion dated Jun. 8, 2012. PCT International Application No. PCT/US2012/027912. Name of Applicant: Bank of America Corporation. English Language. 12 pages.

International Searching Authority. PCT International Search Report and Written Opinion dated Jun. 14, 2012. PCT International Application No. PCT/US12/27892. Name of Applicant: Bank of America Corporation. English Language. 19 pages.

U.S. International Searching Authority. PCT International Search Report and Written Opinion dated Sep. 24, 2012. PCT International Application No. PCT/US12/48697. Name of Applicant: Bank of America Corporation. English Language. 14 pages.

M.J. Welch (2010). Addressing the Challenges in Underspecification in Web Search. (Order No. 3446833, University of California, Los Angeles). ProQuest Dissertations and Thesis; 137; retrieved from http://search.proquest.com/docview/858101550?accountid=14753. (858101500).

K.J. Jeevan & P. Padhi (2006). A Selective Review of Research in Content Personalization. Library Review, 55(9), 556-586. doi:http://dx.doi.org/10.1108/00242530610706761.

P.A. Lessner (2007). Chi-thinking: Chiasmus and Cognition. (Order No. 3297307, University of Maryland, College Park). ProQuest Disserations and Theses; 487; retrieved from http://search.proquest.com/docview/304851937?accountid=14753. (304851937).

International Preliminary Examination Report for International Application No. PCT/US12/27892 dated Sep. 10, 2013; 9 pages.

International Preliminary Examination Report for International Application No. PCT/US2012/027890 dated Sep. 10, 2013; 6 pages.

International Preliminary Examination Report for International Application No. PCT/US12/28036 dated Sep. 10, 2013; 5 pages.

International Preliminary Examination Report for International Application No. PCT/US12/28008 dated Sep. 10, 2013; 7 pages.

International Preliminary Examination Report for International Application No. PCT/US12/27912 dated Sep. 10, 2013; 6 pages.

\* cited by examiner

REAL-TIME ANALYSIS INVOLVING REAL ESTATE LISTINGS

CROSS-REFERENCE TO RELATED APPLICATIONS

This application claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/478,399, filed Apr. 22, 2011, entitled "Real-Time Analysis Involving Real Estate Listings," the entirety of each of which is incorporated herein by reference.

The systems, methods, computer program products, etc. described herein, may be utilized or combined with any other suitable augmented reality ("AR") related application. Non-limiting examples of other suitable AR-related applications include those described in the following U.S. Provisional Patent Applications, the entirety of each of which is incorporated herein by reference:

| U.S. Provisional Ser. No. | Filed On | Title |
|---|---|---|
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

BACKGROUND

Modern handheld mobile devices, such as smart phones or the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have additional features that are becoming increasingly more common and standardized. Such features include, but are not limited to, location-determining devices (e.g., Global Positioning System (GPS) devices), sensor devices (e.g., accelerometers), and high-resolution video cameras. However, most mobile device software is not sufficiently advanced to process images captured by mobile device cameras in real-time. Such software also does not provide any real-time connection between those images and information that is relevant to those images, such as financial information of the mobile device user and/or additional information about an object depicted in the images. Accordingly, there exists a need for an improved system for providing real-time information about images captured by a mobile device. In particular, there exists a need for an improved system for providing real time information about images of real estate captured by a mobile device.

SUMMARY

The following presents a simplified summary of one or more embodiments of the present invention in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In general terms, embodiments of the present invention relate to methods and apparatuses for presenting information associated with real estate listings in an augmented reality environment.

As understood herein, the phrase "augmented reality" generally relates to outputting information at a mobile device based at least partially on, for example, an image captured by the mobile device, GPS coordinates associated with the mobile device, and/or compass information associated with the mobile device. For example, in some embodiments, the mobile device is configured to generate and/or capture a real-time video stream of a real-world environment using a digital camera housed in the mobile device. In such embodiments, the video stream may be viewed by the user of the mobile device in real-time via a display housed in the mobile device. Further, in such embodiments, the mobile device may also be configured to render, display, superimpose, output, and/or otherwise present information in the display of the mobile device, such that the presented information is presented on, over, and/or in the real-time video stream. Still further, in such embodiments, the presented information relates to one or more objects shown in the real-time video stream (e.g., products, people, monuments, landmarks, businesses, etc. shown in the real-time video stream), such as, for example, operating hours of a store shown in the real-time video stream, the menu of a restaurant shown in the real-time video stream, and/or the ingredients of a prescription drug shown in the real-time video stream. By presenting this information over the real-time video stream, an "augmented reality" is created. Of course, it will be understood that a mobile device may be configured to present an AR environment using one or more still images, such that the presented information is superimposed over one or more still images instead of or in addition to a video stream.

As understood herein, real estate listings generally refer to advertisements and/or listings that indicate that real estate property is currently being offered for sale, lease, rent, sublease, trade and/or the like. As understood herein, real estate property includes any type of real property, including but not limited to, houses, apartments, apartment buildings, commercial buildings, condominiums, cooperatives, or "co-ops", unimproved land, improved land, the exterior of the aforementioned, and/or the interior of the aforementioned. In practice, individuals considering a transaction involving real estate property want as much information as possible about the real estate property that is the subject of a listing. Often, individuals drive to the location of the real estate but can only get a view of the real estate property's exterior. To further compound the problem, individuals frequently have to access other sources besides the listing to obtain information about the real estate property, such as the real estate property specifications or tax record data. Additionally, sometimes an individual may want to determine if a certain real estate property is subject to a listing without any prior knowledge.

According to some embodiments of the invention, a user of a mobile device approaches a real estate property. The user wishes to determine if the real estate property is currently the subject of a real estate listing. The user uses the mobile device to capture a real-time video stream of the real estate property. While the user is capturing a real-time video stream of the real estate property, information from the mobile device is transmitted to an AR apparatus (e.g., server, mainframe, database system, etc.) located remotely from the mobile device (e.g., at the financial institution associated with the owner of the real estate property). In such embodiments, the AR apparatus identifies the real estate property that is being captured by the mobile device in a real-time video stream based, at least partially on, the information transmitted from the mobile device. In such embodiments, after identifying the real estate property, the AR apparatus further determines that the real estate property is subject to a real estate listing. In still other embodiments, the AR apparatus may be incorporated into the mobile device.

After determining whether the real estate property is subject to a real estate listing, in some embodiments, the AR apparatus (and/or the mobile device) presents, dynamically, automatically, in real-time, and/or via the mobile device, information that indicates that the real estate property is subject to a real estate listing. In some embodiments, the information is presented as an indicator, which, in some embodiments, is a colored shape that surrounds the real estate property shown on the mobile device's display. By viewing the indicator, the user can know whether the real estate property is subject to a real estate listing. In some embodiments of the invention, the indicator is selectable such that if the user selects the indicator, the indicator will display additional information about the real estate property, including, but not limited to, the real estate property's specifications.

In general terms, embodiments of the present invention relate to apparatuses, methods, and computer program products for presenting information associated with a real estate listing in an augmented reality environment. For example, in some embodiments, the apparatus (a) receives positioning information from a mobile device; (b) identifies, based at least partially on the positioning information, a real estate property; (c) determines that the real estate property is subject to a real estate listing; and (d) presents, via the mobile device, information about the real estate listing.

In some embodiments of the invention, the positioning information comprises GPS coordinates. In other embodiments of the invention, the positioning information comprises directional information. In other embodiments of the invention, the positioning information comprises information associated with an image. In yet some other embodiments, the information associated with an image comprises receiving the image.

In some embodiments of the invention, identifying, based at least partially on the positioning information, a real estate property comprises identifying the address of a real estate property.

In some embodiments of the invention, determining that the real estate property is subject to a real estate listing comprises comparing the address of the real estate property to an address associated with a real estate listing;

In some embodiments of the invention, presenting, via the mobile device, information about the real estate listing comprises presenting information that indicates that the real estate property is subject to the real estate listing. In other embodiments, presenting, via the mobile device, information about the real estate listing comprises displaying, on a display of the mobile device, the information about the real estate listing. In yet some other embodiments of the invention, displaying, on a display of the mobile device, the information about the real estate listing comprises superimposing, over a real-time video stream being captured by the mobile device, the information about the real estate listing.

In some embodiments of the invention, the information about the real estate listing comprises displaying real estate property specifications. In some other embodiments of the invention, the information about the real estate listing comprises displaying Multiple Listing Service information. In yet some other embodiments of the invention, the information about the real estate listing comprises displaying real estate property comparisons. In other embodiments of the invention, the information about the real estate listing comprises displaying the listed price of the real estate property. In still other embodiments of the invention, the information about the real estate listing comprises displaying tax record information of the real estate property.

In some embodiments, the apparatus also presents, via the mobile device, an offer to take out a loan to purchase the real estate property. In yet some other embodiments, the apparatus also determines that the mobile device is capturing a real-time video stream that shows the real estate property before presenting, via the mobile device, the information about the real estate listing.

In some embodiments of the invention, presenting information that indicates that the real estate property is subject to the real estate listing comprises presenting an indicator that can be selected by a user of the mobile device to display information about the real estate property that is subject to the real estate listing. Additionally, in some embodiments of the invention, the apparatus compiles a database of real estate listings.

The features, functions, and advantages that have been discussed may be achieved independently in various embodiments of the present invention or may be combined with yet other embodiments, further details of which can be seen with reference to the following description and drawings. Additionally, as will be appreciated by one of ordinary skill in the art, the features, functions, and advantages that have been discussed may include and/or be embodied as an apparatus (including, for example, a system, machine, device, computer program product, and/or the like), as a method (including, for example, a business method, computer-implemented process, and/or the like), or as any combination of the foregoing.

BRIEF DESCRIPTION OF THE DRAWINGS

Figure 1:
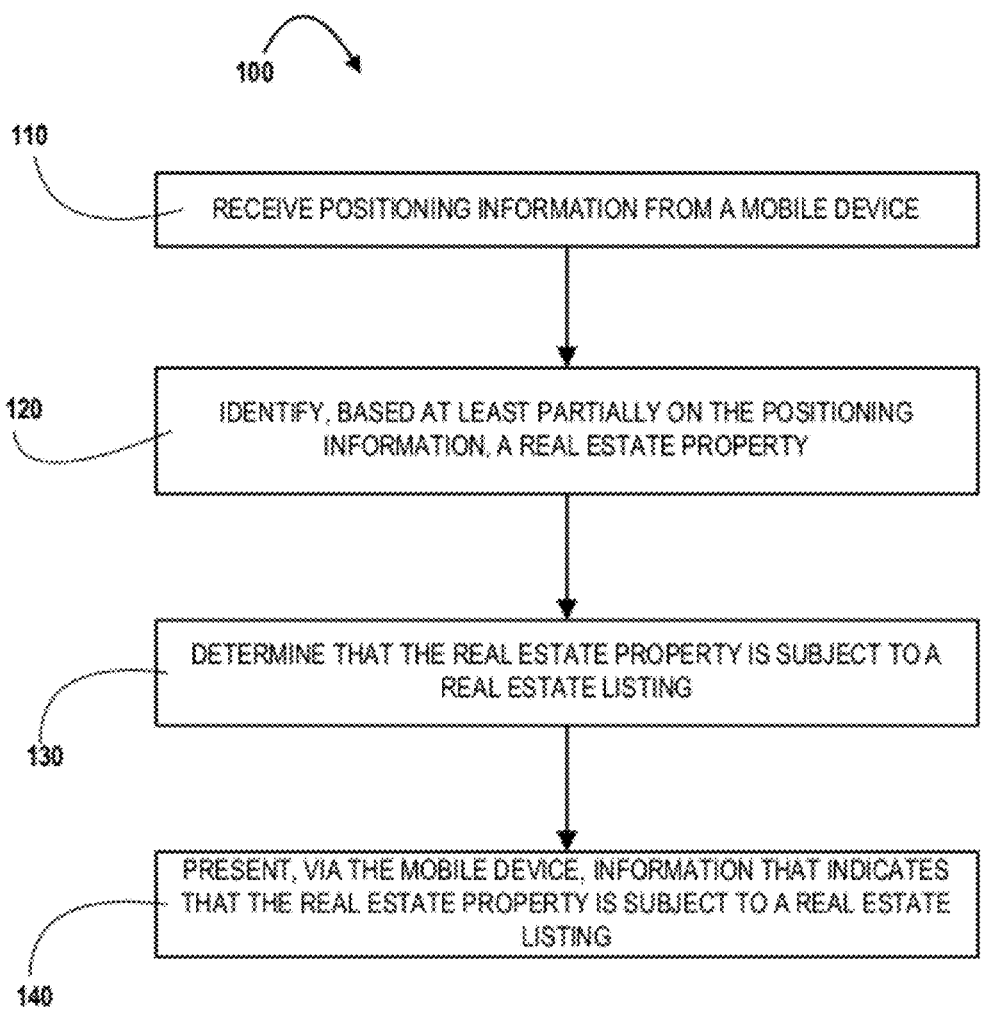

Having thus described some embodiments of the present invention in general terms, reference will now be made to the accompanying drawings, where:

FIG. 1 is a flow diagram illustrating a general process flow for presenting information associated with real estate listings in an augmented reality environment, in accordance with an embodiment of the present invention.

Figure 2:
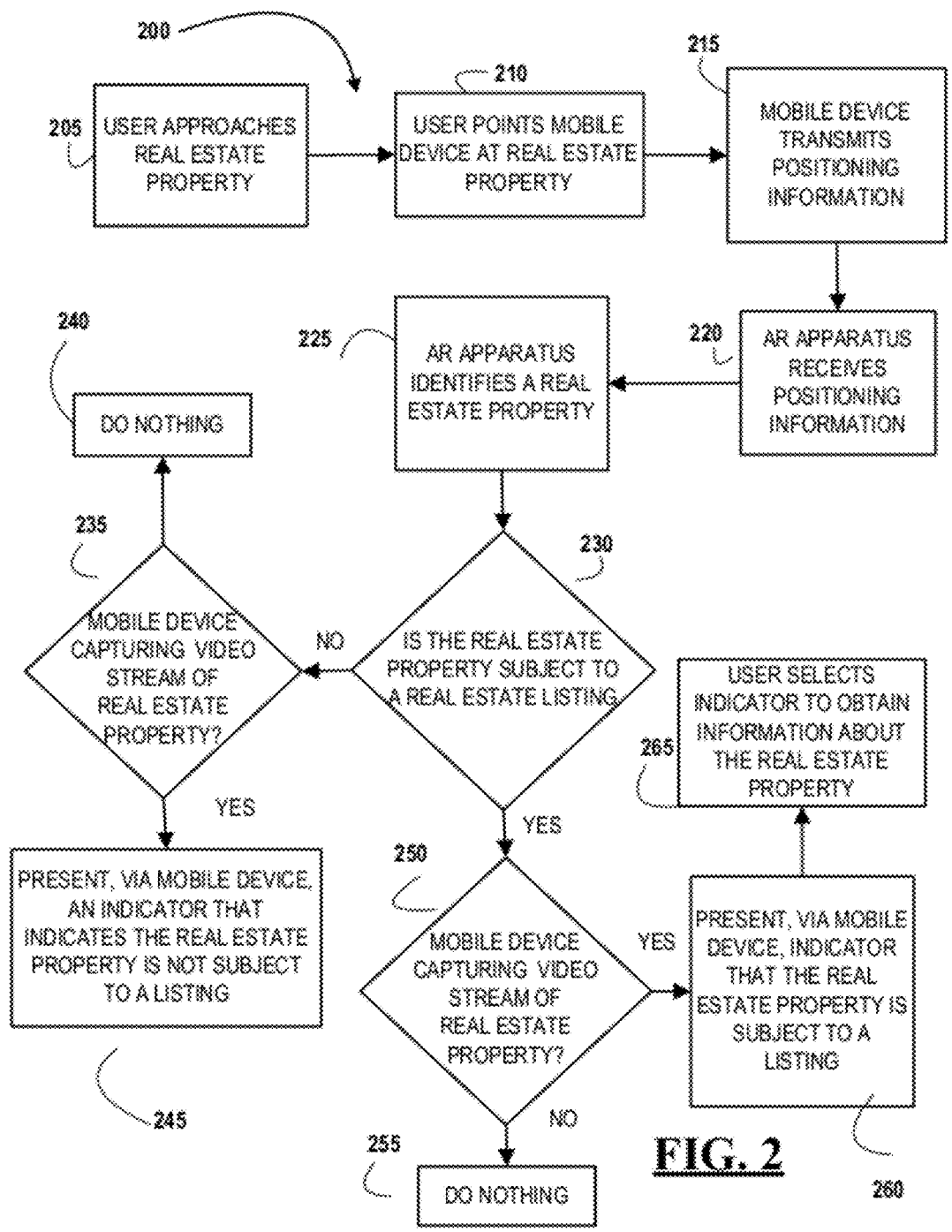

FIG. 2 is a flow diagram illustrating a more-detailed process flow for presenting information associated with real estate listings in an augmented reality environment, in accordance with an embodiment of the present invention.

Figure 3:
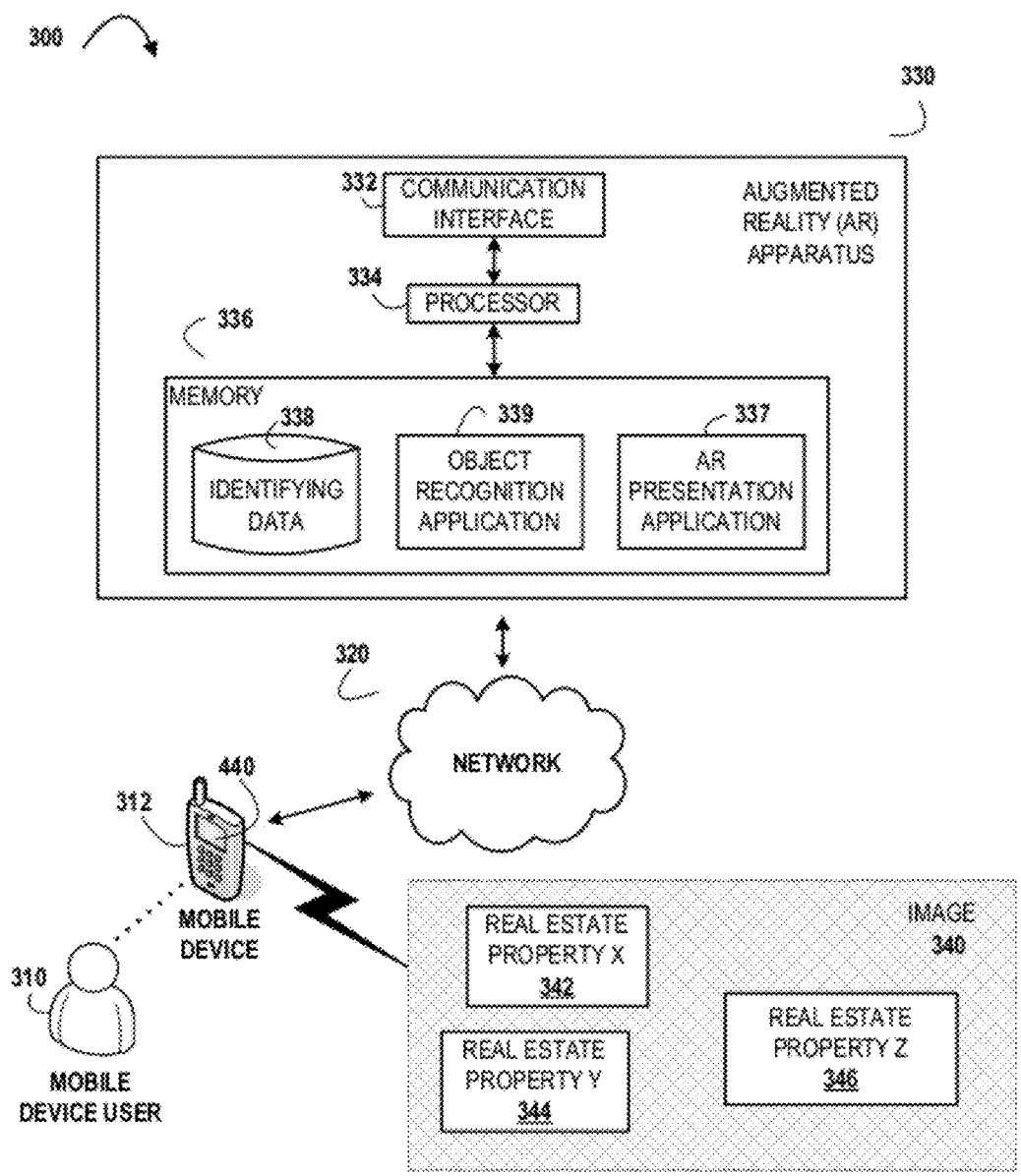

FIG. 3 is a block diagram illustrating technical components of a system for presenting information associated with real estate listings in an augmented reality environment, in accordance with an embodiment of the present invention.

Figure 4:
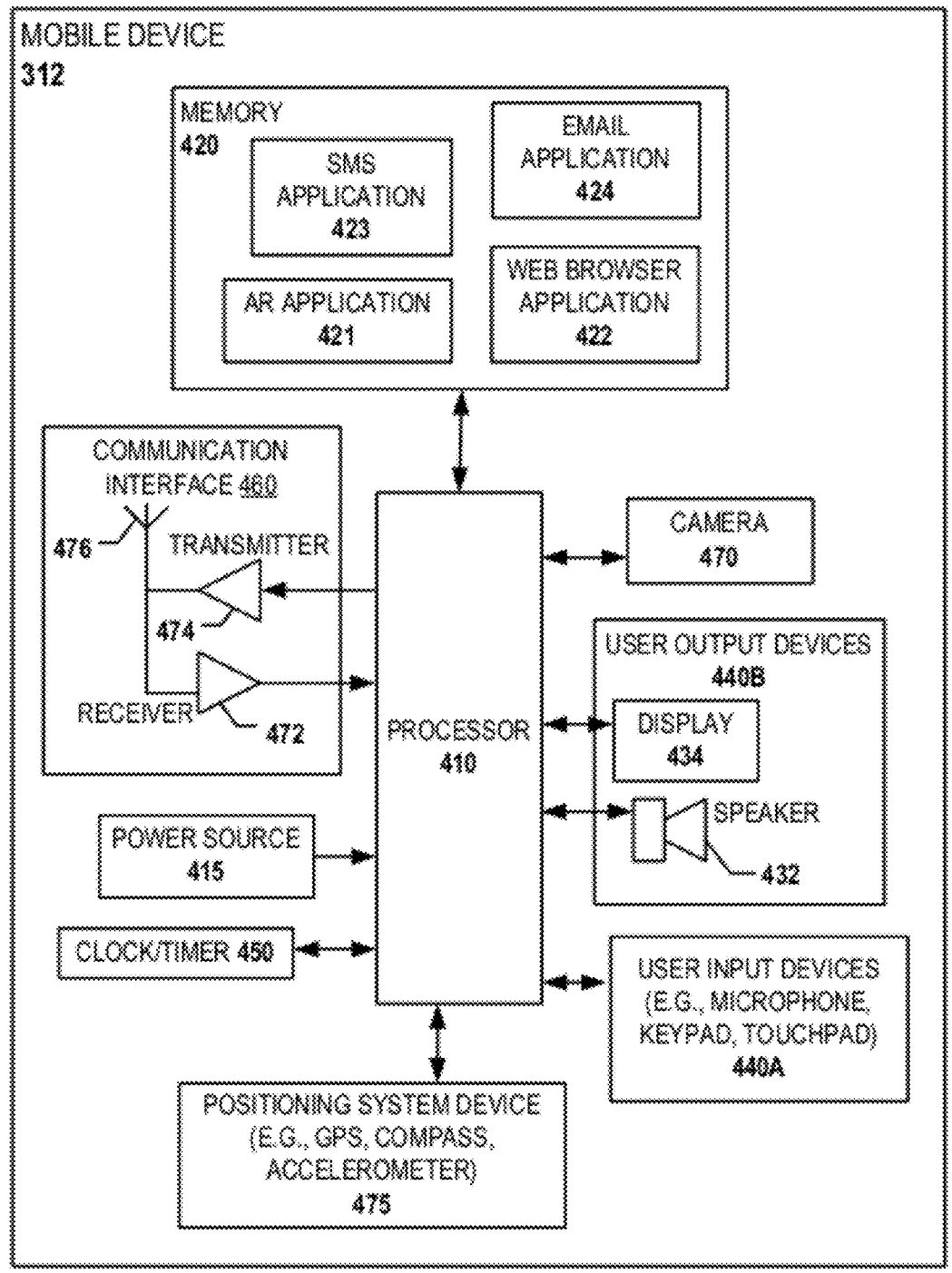

FIG. 4 is a block diagram illustrating technical components of a mobile device configured to present and/or participate in the presentation of information associated with real estate listings in an augmented reality environment, in accordance with an embodiment of the present invention.

Figure 5:
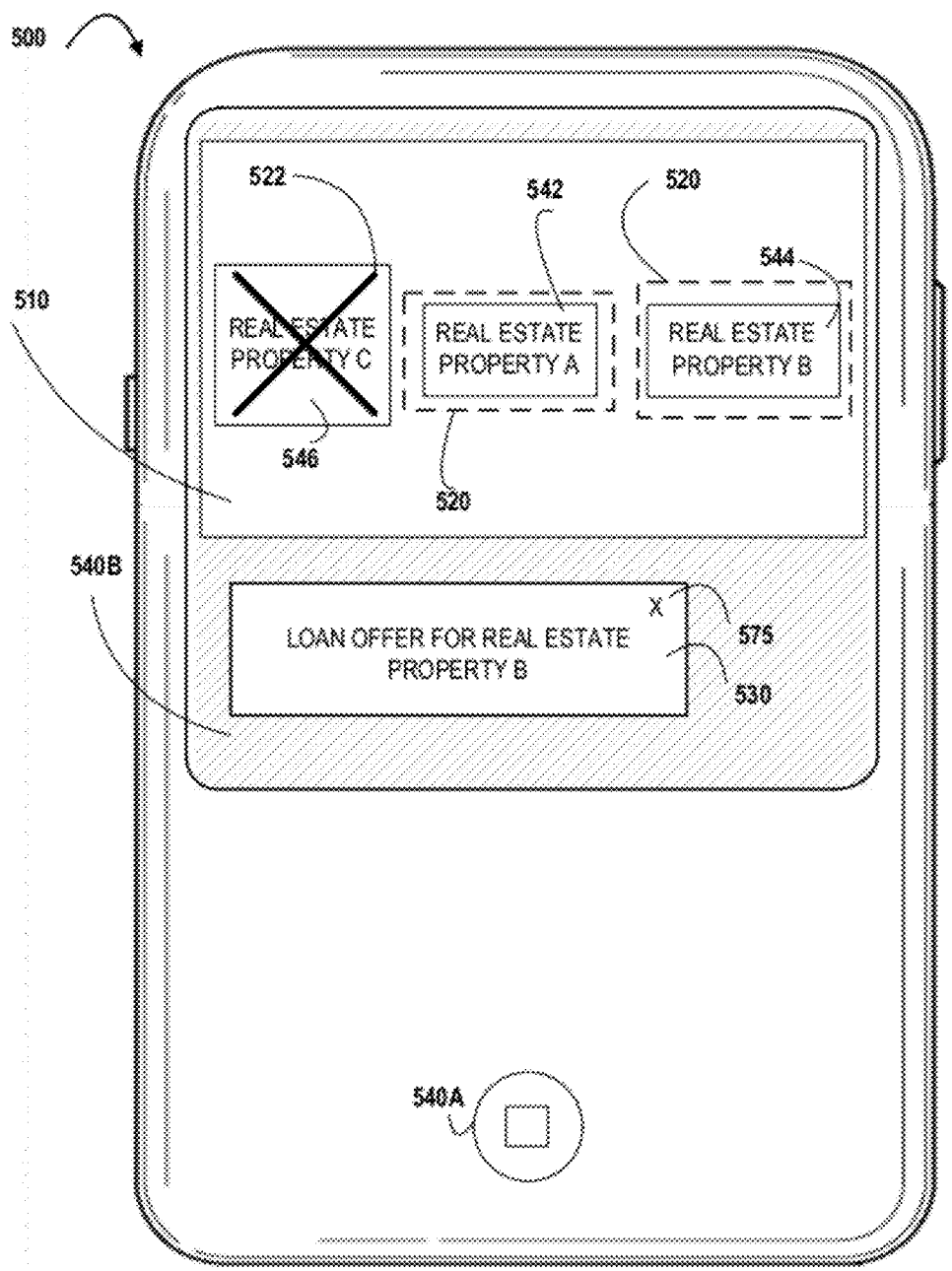

FIG. 5 is a block diagram illustrating the presentation of information associated with real estate listings in an augmented reality environment, in accordance with an embodiment of the present invention.

Figure 6:
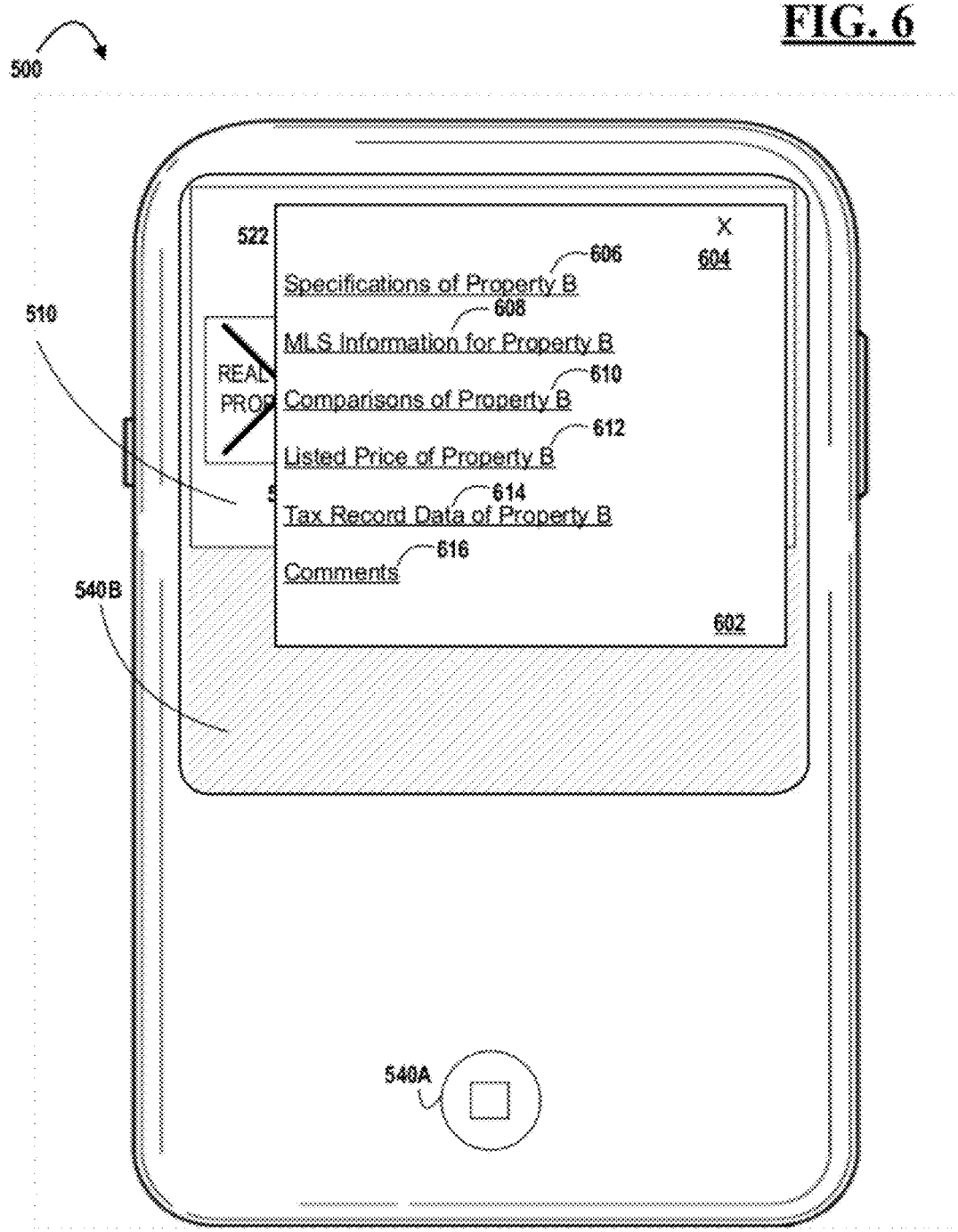

FIG. 6 is a block diagram illustrating the presentation of information associated with real estate listings in an augmented reality environment, in accordance with an embodiment of the present invention.

Figure 7:
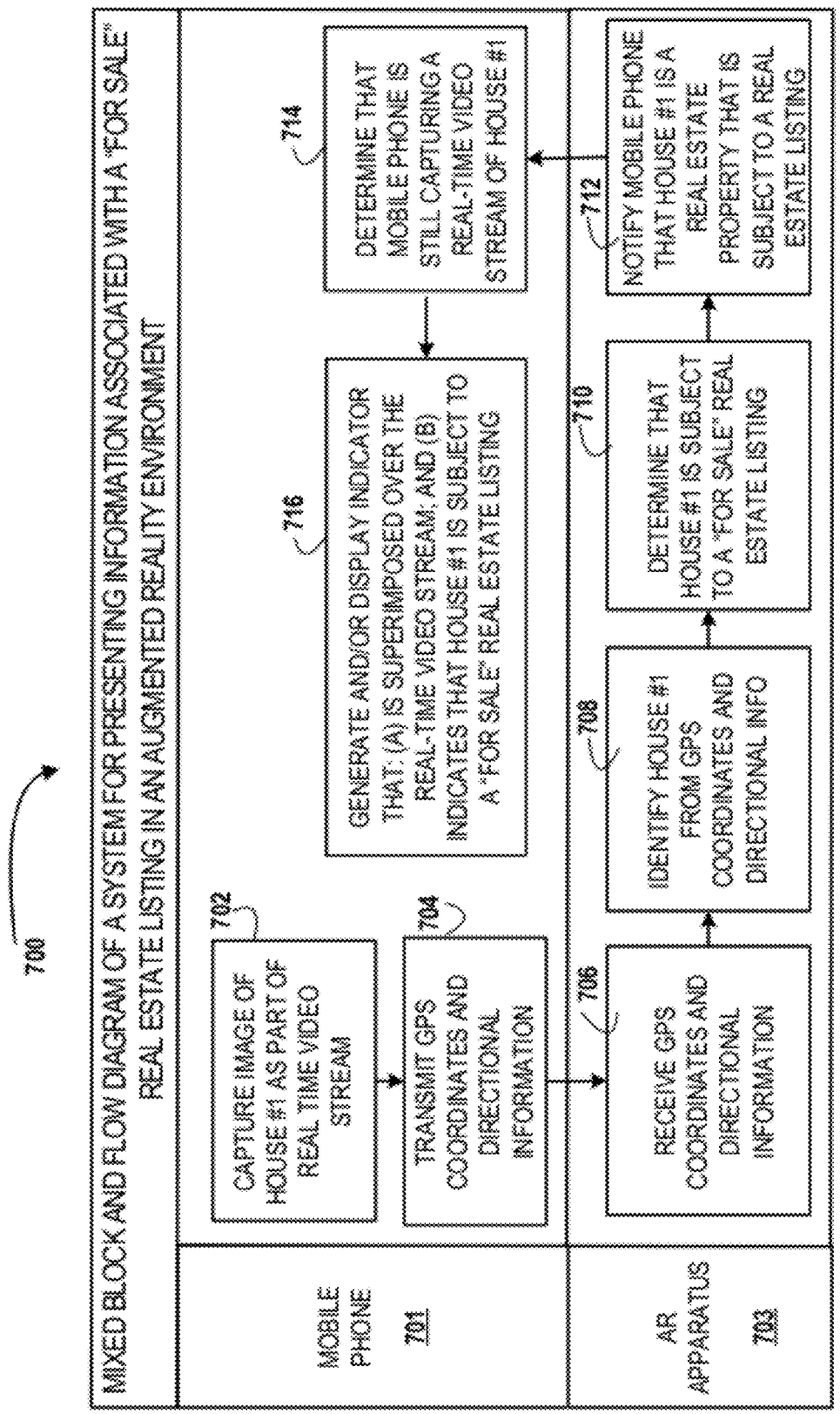

FIG. 7 is a mixed block and flow diagram of a system for presenting information associated with real estate listings in an augmented reality environment, in accordance with an embodiment of the present invention.

DETAILED DESCRIPTION OF EMBODIMENTS OF THE PRESENT INVENTION

Referring now to FIG. 1, a general process flow 100 is provided for presenting information associated with real estate listings in an augmented reality environment. Process flow 100 may also be implemented to determine whether a real estate property is subject to a real estate listing. In some embodiments, the process flow 100 is performed by an apparatus (i.e., one or more apparatuses) having hardware and/or software configured to perform one or more portions of the process flow 100. In such embodiments, as represented by block 110, the apparatus is configured to receive positioning information from a mobile device. As represented by block 120, the apparatus is also configured to identify, based at least partially on the positioning information, a real estate property. In addition, as represented in block 130, the apparatus is configured to determine that the real estate property is subject to a real estate listing. Lastly, as represented in block 140, the apparatus is configured to present, via the mobile device, information that indicates that the real estate property is subject to a real estate listing.

The term "determine," in some embodiments, is meant to have one or more of its ordinary meanings (i.e., its ordinary dictionary definition(s)), but in other embodiments, that term is meant to have one or more of the ordinary meanings of one or more of the following terms: decide, conclude, verify, ascertain, find, discover, learn, calculate, observe, read, and/or the like. Further, in some embodiments, the phrase "based at least partially on," is meant to have one or more of its ordinary meanings, but in other embodiments, that phrase is meant to have one or more ordinary meanings of one or more of the following terms and/or phrases: as a result of, because, after, if, when, in response to, and/or the like.

It will also be understood that the apparatus having the process flow 100 can include one or more separate and/or different apparatuses. For example, in some embodiments, one apparatus (e.g., the AR apparatus 330 described in connection with FIG. 3) is configured to perform all of the portions of the process flow 100 represented by blocks 110-140. Alternatively, in other embodiments, a different apparatus (e.g., the mobile device 312 described in connection with FIG. 4) is configured to perform all of the portions of process flow 100 represented by blocks 110-140. It will also be understood that, in some other embodiments, an AR apparatus (e.g., the AR apparatus 330) and mobile device (e.g., mobile device 312) are both configured to perform one or more of the portions of the process flow 100. For example, in some embodiments AR apparatus 330 may perform the portions of process flow 100 represented by blocks 110-130, while mobile device 312 may perform the portion represented by block 140.

Regarding block 110, the phrase "positioning information" can be any amount or type of information about the position of a mobile device. For example, in some embodiments, the positioning information describes the geographic location of the mobile device. In some embodiments the information describing the geographic location of the mobile device includes GPS satellite information and/or coordinates. In other embodiments of the invention, the positioning information includes directional data that describes the direction in which the mobile device is facing.

In other embodiments, the positioning information is an image captured by the mobile device that shows the mobile device's position in relation to the subject matter shown in the image. In some embodiments, the image is captured by the camera of the mobile device. In some embodiments, the image is a still image captured by the mobile device. In some other embodiments, the image is a single frame from a real-time video stream captured by the mobile device. In some embodiments, the image is a portion of another image.

In other embodiments, the positioning information is metadata about an image, which could be decoded or coded into the image or stored elsewhere. In other embodiments, the positioning information from the mobile device comprises the results of any analysis of an image (e.g., image comparison analysis, pattern recognition analysis, character recognition, optical character recognition (OCR), and/or image recognition analysis). In another embodiment of the invention, the positioning information is the output of any modeling and/or composite imaging processes that are based all or in part on an image.

The mobile device referred to in block 110 may be any mobile communication device, such as a cellular telecommunications device (i.e., a cell phone or mobile phone), personal digital assistant (PDA), a mobile Internet accessing device, or any other mobile device including, but not limited to pagers, mobile televisions, gaming devices, laptop computers, cameras, video recorders, audio/video player, radio, GPS devices, any combination of the aforementioned, or the like.

In some embodiments, the mobile device and/or the AR apparatus access one or more databases or datastores (not shown) to search for and/or retrieve information related to the positioning information. In some embodiments, the mobile device and/or the AR apparatus access one or more datastores local to the mobile device and/or AR apparatus and in other embodiments, the mobile device and/or AR apparatus access datastores remote to the mobile device and/or AR apparatus. In some embodiments, the mobile device and/or AR apparatus access both a memory and/or datastore local to the mobile device and/or AR apparatus as well as a datastore remote from the mobile device and/or AR apparatus Lastly, in some embodiments, the apparatus having the process flow 100 receives information from a mobile device through any type of communication network. In some embodiments, the apparatus receives the information from a mobile device via a wireless and/or contactless network. In some embodiments, the apparatus receives the information from the mobile device via second-generation (2G) wireless communication protocols (e.g., IS-136 (time division multiple access (TDMA), GSM (global system for mobile communication), and/or IS-95 (code division multiple access (CDMA)), third-generation (3G) wireless communication protocols (e.g., Universal Mobile Telecommunications System (UMTS), CDMA2000, wideband CDMA (WCDMA) and/or time division-synchronous CDMA (TD-SCDMA)), fourth-generation (4G) wireless communication protocols, and/or the like. In some other embodiments, the apparatus having the process flow 100 is configured to receive the information from the mobile device in accordance with non-cellular communication mechanisms, such as via a wireless local area network (WLAN), global area network (GAN), a wide-area network (WAN), the Internet, and/or other communication/data networks. In other embodiments, the apparatus having the process flow 100 receives the information from the mobile device through wired communications.

Regarding block 120, the phrase "identifying a real estate property" refers to using any method to identify a real estate property by any metric. In some embodiments, the positioning information is used to identify the real estate property by its street address. For example, if the positioning information comprises GPS satellite information and/or coordinates, as well as directional information, the identity and street address of the real estate property at that geographic location and direction can be determined. In other embodiments, the positioning information is used to identify real estate property by other metrics, including but not limited to, GPS satellite information and/or coordinates of the real estate property. In other embodiments, the positioning information is used to identify the real estate property by the borders of the real estate property. For example, if the positioning information comprises an image, then the real estate property can be identified by matching the image to the image of a known real estate property having known borders. In other embodiments, where the positioning information is an image, the real estate property can be identified by analyzing the image. In some embodiments, the real estate property is identified by analyzing the image to determine that it shows all or a portion of the real estate property. As one of ordinary skill in the art will appreciate, the positioning information can be used, at least in part, to identify real estate property by numerous different methods. In some embodiments, if the apparatus having the process flow 100 does not identify the real estate property based upon the positioning information, the apparatus prompts the user to provide additional information about the real estate property, such as the street address or other metrics.

Regarding block 130, the phrase "determining that the real estate property is subject to a real estate listing" generally refers to determining whether the real estate property is being offered for sale, lease, rent, sublease, trade, any publicly available data regarding the property, and/or the like. For simplicity, a real estate property that is subject to a real estate listing may be hereinafter referred to as a "subject real estate property." The apparatus having the process flow 100 may use any means to determine that the real estate property is subject to a real estate listing. In some embodiments, a determination of whether the real estate property is subject to a real estate listing can be made by comparing the identity of the real estate property to the identity of a known real estate property that is known to be subject to a real estate listing. In some embodiments, the apparatus may compare the street address of the identified real estate property to the address of another real estate property that is known to be subject to a real estate listing. In other embodiments, the apparatus may compare the image of an identified real estate property to the image of another real estate property that is known to be subject to a real estate listing. As one of ordinary skill in the art will appreciate, the determination of whether a real estate property is subject to a real estate listing may be achieved by numerous different methods.

Generally, in some embodiments, the apparatus determines that the real estate property is subject to a real estate listing by using information about the real estate property and comparing such information with identifying data of real estate property that is known to be subject to a real estate listing (hereinafter referred to as "identifying data"). In some embodiments, if the information about the real estate property matches the identifying data, either exactly or with a certain degree of confidence, then the apparatus determines that the real estate is subject to a real estate listing. If the information about the real estate property does not match the identifying data, either exactly or within a certain degree of confidence, then the apparatus determines that the real estate is not subject to a real estate listing. Identifying data may be retrieved from any source, including third party sources that compile information about real estate properties that are subject to real estate listings.

The identifying data is any number and/or type of data that identifies a real estate property that is subject to a real estate listing. In some embodiments of the invention, the identifying data includes: the size, shape or color of the subject real estate property and/or specific features of the subject real estate property; the ratio of the size of one feature of the subject real estate property to another feature of the subject real estate property; and/or the subject real estate property's physical location, including but not limited to street address and/or geographic coordinates. In some embodiments, the identifying data concerns a very small feature of the subject real estate property, such as the alpha-numeric characters that identify the subject real estate property's street address, whereas, in other embodiments, the identifying data concerns the entire subject real estate property, such as the unique shape, size, structure etc.

In some embodiments, the information about the real estate property describes the geographic location of the real estate property. Therefore, in some embodiments, the apparatus compares the information describing the geographic location of the real estate property to identifying data describing the geographic location of a subject real estate property to determine where the real estate property is subject to a real estate listing. In other embodiments, a similar process may be used by comparing the street address of the real estate property to identifying data of a subject real estate property.

In other embodiments of block 130, the apparatus uses pattern recognition algorithms such as decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels (e.g., Bayesian networks and/or Markov random fields), ensemble learning algorithms (e.g., bootstrap aggregating), boosting, ensemble averaging, combinations thereof, and/or the like to compare information about the real estate property to identifying information.

The identifying data may be stored in one or memory devices of the one or more apparatuses that perform the steps of process flow 100. In some embodiments, the identifying data is added to the memory device by the user or a third party. In some embodiments, the user or third party adds the identifying data to a memory device and then associates the identifying data with at least the street address of a subject real estate property. In other embodiments, the identifying data is associated with any other type of additional information about the subject real estate property.

In yet another embodiment of block 130, the information about the real estate property may match one or more pieces of identifying data, such that the apparatus determines that real estate property is subject to more than one real estate listing. In some embodiments, the user is presented with the multiple candidate identifications and chooses the appropriate identification or inputs a different identification. The multiple candidates may be presented to the user by any means. For instance, in one embodiment, the candidates are presented to the user as a list wherein the "strongest" candidate (i.e., the one most likely represent the real estate property in the image) is listed first based on reliability of the identification. Upon input by the user identifying the proper real estate listing, the apparatus "learns" from the input and stores additional identifying data in order to avoid multiple identification candidates for the same subject real estate property in future identifications.

In some embodiments of block 130, the determining that the real estate property is subject to a real estate listing is achieved by comparing information about the real estate property to a real estate listing itself. In some embodiments, a database of real estate listings is compiled and the information about the real estate property is compared to this database. As one of ordinary skill in the art will appreciate, in some embodiments, the database of real estate listings is compiled by accessing, copying, purchasing, and/or otherwise acquiring information relating to real estate listings from third party sources.

Regarding block 140, the phrase "information that indicates that the real estate property is subject to a real estate listing" generally means any number and/or type of information that informs the user that the real estate property is the subject to a real estate listing. In some embodiments, the information includes information about the real property listing, including the street address of a real estate property subject to the listing, the asking price of a real estate property subject to the listing, and/or the specifications of a real estate property subject to the listing. In some embodiments, the information is an indicator, such as a tab, tag, highlighted area, hot spot, link, graphic, and/or image, that is located proximate to the real estate property displayed on the display of the mobile device. The indicator may be any color and may be any shape. In embodiments where all or part of the indicator is a line, the line may be solid, dashed, dotted or any combination thereof. In some embodiments, the indicator that indicates that the real estate property is the subject of a real estate listing is green. As one of skill in the art will appreciate, an "indicator", as used herein, is also a type of indication (i.e., a visual indication).

In some embodiments, the indicator is "selectable." In some embodiments, the user selects the indicator and the indicator displays information related to the subject real estate property on the mobile device display. The information may include any desired information concerning the subject real estate property and may range from basic information to greatly detailed information. For example, in some embodiments, the indicator displays information including the specifications on the real estate property, photos of the real estate property, Multiple Listing Service (MLS) information, applicable comparisons to other real estate properties, the listed price of the subject real estate property, tax record data for the subject real estate property, title records, liens, and/or the like. In some embodiments, the indicator provides an Internet hyperlink to enable the user to obtain further information on the subject real estate property. Alternatively, in other embodiments, all or a portion of the indicator is the hyperlink. In other embodiments, the indicator may provide a link to all Internet hyperlinks that include photos of the interior and/or exterior of the real estate. In yet other embodiments, the indicator may provide a link to any information in the public domain regarding the current or past residence, current or past history of property, floor plans, crime reports, location based data (including, for example, schools, shopping, criminals, friends, etc. in the area), etc.

In some embodiments, the hyperlink enables the user to capture pictures and/or video of the exterior or interior of the subject real estate property and logging comments into an associated subject real estate property logbook or the like. In some embodiments, the captured pictures, video, and/or logged comments may then be communicated via email, text, and the like to any individual associated with the mobile device user, such as a friend or family member.

In embodiments in which the indicator is an interactive, the user may select the indicator by any conventional means for interaction with the mobile device. For instance, in some embodiments, the user utilizes an input device, such as a keyboard to highlight and select the indicator in order to retrieve the information. In some embodiments, the user selects the indicator by the touch screen display of the mobile device. In other embodiments, the user selects the indicator by using voice commands.

In some embodiments, the indicator is not interactive and simply provides information to the user by displaying information on the display of the mobile device without having to select the indicator. For example, in some embodiments, the indicator identifies a subject real estate property's address, identifies the subject real estate property's listing price, and/or gives brief information about the subject real estate property, etc., rather than providing extensive details that require interaction with the indicator.

Furthermore, the indicator may be displayed at any size on the mobile device display. In some embodiments, the indicator is small enough that it is positioned on, next to, or around the image of the subject real estate property displayed on the mobile device display. In some embodiments, the image of the subject real estate property displayed on the mobile device display remains discernable next to the indicator. In some embodiments, the indicator is semi-transparent such that the image of the subject real estate property displayed on the mobile device display remains discernable behind the indicator. In some embodiments, the image of the subject real estate property on the mobile device display is discernable because the indicator forms an outline of the subject real estate property or otherwise surrounds the subject real estate property. In this way, the estimated property boundaries from retrieved survey data may be superimposed over the video image to provide the individual precise boundary data. In yet some other embodiments, the indicator is large enough to completely cover the subject real estate property displayed on the mobile device display. Indeed, in some embodiments, the indicator covers a majority and/or the entirety of the mobile device display.

Further regarding block 140, the phrase "present, via the mobile device" generally means presenting an indication via the mobile device. In some embodiments, the apparatus presents, via the mobile device, by outputting information via an output device of the mobile device. For example, in some embodiments, the apparatus presents the information by showing the information as a graphical indication on the display of the mobile device. In some embodiments, the apparatus having the process flow 100 presents the indicator by superimposing the indicator over a real-time video stream that is captured by the mobile device. This real-time video stream shows the subject real estate property on the mobile device display. In some embodiments, the indicator is superimposed over the real-time video stream only if the real-time video stream shows the real estate property. Thus, in some embodiments, the mobile device determines if it is capturing a real-time video stream that shows the real estate property. In some embodiments, this determination is made based upon the mobile device's geographic location, directional information, and/or the field of view of the mobile device camera. In other embodiments, the AR apparatus determines if the mobile device is capturing a real-time video stream that shows the real estate property. In some embodiments, this determination is made by analyzing the image of the real estate property in the real-time video stream.

In some embodiments of the invention, "presenting" includes transmitting a still image of the subject real estate property to the mobile device, where the still image contains the indicator. The still image may be transmitted to the mobile device via email, MMS services, picture messages and/or any other methods known to those skilled in the art. Further, in some other embodiments, presenting includes notifying the mobile device that the positioning information identifies a real estate property that has been determined to be subject to a real estate listing.

Although not illustrated in FIG. 1, in some embodiments, the apparatus having the process flow 100 also presents, via the mobile device, information that a real estate property is not subject to a real estate listing. In some embodiments, the information is an indicator that is displayed on the mobile device display. In some embodiments, the indicator that indicates that the real estate property is not subject to a real estate listing is red. In some embodiments, the indicator is shaped as an "X" or cross to indicate that the real estate property is not subject to a real estate listing. In some embodiments, the indicator that indicates that the real estate property is not subject to a real estate listing is located proximate to the non-listed real estate property.

Referring now to FIG. 2, a more-detailed process flow 200 for presenting information associated with a real estate listing in an augmented reality environment, in accordance with an embodiment of the present invention. In some embodiments, one or more portions of the process flow 200 are performed by an apparatus having hardware and/or software configured to perform one or more portions of the process flow 200. In some of these embodiments, the apparatus configured to perform the process flow 100 is also configured to perform the process flow 200. As such, it will be understood that the process flow 200 illustrated in FIG. 2 represents an embodiment of the process flow 100 described in connection with FIG. 1.

As represented by block 205, a user approaches a real estate property. In some embodiments of the invention, the user approaches the real estate property on foot. In other embodiments of the invention, the user approaches the real estate property by driving past the real estate property. In some embodiments, the user approaches the real estate property by parking and/or otherwise stopping a vehicle in front of the real estate property.

After approaching the real estate property, at block 210, the user points a mobile device at the real estate property. In this process flow, the user points the mobile device at the real estate property such that the real estate property is within the field of view of the mobile device's digital video recording functionality. However, in other embodiments of the invention, the user points the mobile device at the real estate property such that the real estate property is within the field of view of the mobile device's digital camera functionality.

In some embodiments, the user executes an AR application, which is configured to run on the mobile device and begin real-time video capture. However, in some other embodiments, the AR application includes an "always on" feature in which the mobile device is continuously capturing real-time video. In such embodiments, the AR application may be configured to alert the user that a particular real estate property has been identified. The user may set any number of user preferences to tailor the AR experience to their needs. For instance, the user may opt to only be alerted if a certain subject real estate property is identified. Additionally, it will be appreciated that the "always on" feature in which video is continuously captured may consume the mobile device power source more quickly. Thus, in some embodiments, the "always on" feature may disengage if a determined event occurs such as low power source, low levels of light for an extended period of time (e.g., such as if the mobile device is in a user's pocket obstructing a clear view of the environment from the mobile device), if the mobile device remains stationary (thus receiving the same video stream) for an extended period of time, the user sets a certain time of day to disengage, etc. Conversely, if the "always on" feature is disengaged due to the occurrence of such an event, the user may opt for the "always on" feature to re-engage after the duration of the disengaging event (e.g., power source is re-charged, light levels are increased).

At block 215, the mobile device transmits positioning information to the AR apparatus. In some embodiments, the positioning information is transmitted via a cellular network, such as a wireless communication protocol, and in other embodiments, the positioning information is transmitted via a non-cellular network, such as a WLAN, WAN, GAN, and/or the Internet. In other embodiments, especially where the AR apparatus is incorporated into the mobile device, the mobile device transmits positioning information via a wired network.

At block 220, the AR apparatus receives the positioning information from the mobile device. In some embodiments, the positioning information from the mobile device describes the geographic location of the mobile device. In some embodiments the positioning information comprises the GPS coordinates of the mobile device and/or directional data that describes the direction in which the mobile device is facing. In other embodiments, the positioning information comprises an image which depicts the location of the mobile device relative to a real estate property. In some embodiments, the AR apparatus receives the positioning information via a cellular network, such as a wireless communication protocol, and in other embodiments, the apparatus receives the information via a non-cellular network, such as a WLAN, WAN, GAN, and/or the Internet. In other embodiments, the AR apparatus receives the positioning information via a wired network.

At block 225, the AR apparatus identifies a real estate property. In some embodiments, the AR apparatus identifies the real estate property based at least in part on the positioning information. In some embodiments where the positioning information comprises GPS coordinates and/or directional data, the AR apparatus determines the identity of the real estate property at that geographic location and direction. In some embodiments where the positioning information comprises an image, the AR apparatus determines the identity of the real estate property by comparing the image to images of known real estate properties. In some embodiments of the invention, the AR apparatus identifies the real estate property by its street address and in other embodiments, the real estate property is identified by other metrics, such as latitude/longitude and/or borders.

At block 230, the AR apparatus determines whether the real estate property is subject to a real estate listing. In some embodiments, the AR apparatus compares information about the real estate property to identifying data stored in a memory device to determine if the real estate property is subject to a real estate listing. The identifying data is any number and/or type of data that identifies a subject real estate property. In some embodiments of the invention, the identifying data includes: the size, shape or color of the subject real estate property and/or specific features of the subject real estate property; the ratio of the size of one feature of the subject real estate property to another feature of the subject real estate property; and/or the subject real estate property's physical location, including but not limited to street address and/or geographic coordinates. In some embodiments, the identifying data concerns a very small feature of the subject real estate property, such as the alpha-numeric characters that identify the subject real estate property's street address, whereas, in other embodiments, the identifying data concerns the entire subject real estate property, such as the unique shape, size, structure etc. In some embodiments of the invention, the AR apparatus uses pattern recognition algorithms to compare the information about the identity of the real estate property to identifying data.

In some embodiments, the AR apparatus only determines that the real estate property is subject to a real estate listing if there is a 100% confidence rating for the correlation of the information about the identity of the real estate property and the identifying data. In some embodiments, the AR apparatus determines that the real estate property is subject to a real estate listing if the correlation of the information about the identity of the real estate property and the identifying data exceeds a confidence threshold. In some embodiments, if the AR apparatus determines that the real estate property is not subject to a real estate listing, then the process flow proceeds to block 235.

At block 235, the AR apparatus determines whether the mobile device is capturing a real-time video stream of the real estate property that is not the subject to a real estate listing. In some embodiments of the invention where the mobile device performs all or part of the steps of process flow 200, block 235 is performed by the mobile device. In other embodiments of the invention where the AR apparatus performs all or part of the steps of process flow 200, block 235 is performed by the AR apparatus. In some embodiments, the AR apparatus determines that the mobile device is capturing a real-time video stream of the real estate property that is not subject to a real estate listing by receiving information associated with the images that comprise the real-time video stream being captured by the mobile device. In other embodiments, the mobile device transmits information to the AR apparatus indicating that it is capturing a real-time video stream of the real estate property that is not the subject to a real estate listing. If the AR apparatus determines that the mobile device is not capturing a real-time video stream of the real estate property that is not subject to a real estate listing, then the apparatus does nothing, as shown at block 240. However, if the AR apparatus does determine that the mobile device is capturing a real-time video stream of the real estate property that is not subject to a real estate listing, then the AR apparatus presents, via the mobile device, an indicator that the real estate property is not subject to a real estate listing, as shown in block 245.

Returning to block 230, if the AR apparatus determines that the real estate property is subject to a real estate listing, then the process flow proceeds to block 250. Similar to block 235, at block 250, a determination is made as to whether the mobile device is capturing a real-time video stream of the real estate property that is subject to the real estate listing. If the mobile device is not capturing a real-time video stream of the real estate property that is subject to the real estate listing, then the AR apparatus does nothing, as shown in block 255. However, if the mobile device is capturing a real-time video stream of the real estate property that is subject to the real estate listing, then the AR apparatus presents, via the mobile device, an indicator that indicates that the real estate property is the subject of a real estate listing, as shown at block 260.

In some embodiments, the information provided by the real-time video stream may be compared to data provided to the system through an API. In this way, the data may be stored in a separate API and be implemented by request from the mobile device and/or AR apparatus accesses another application by way of an API.

As one of ordinary skill in the art will appreciate, if the AR apparatus determines that the mobile device is not capturing a real-time video stream of the real estate property at either block 235 or block 250, but later determines that that the mobile device is capturing a real-time video stream of the real estate property, then the AR apparatus may still present, via the mobile device, an indicator (as described in relation to either block 245 or block 260).

At block 260, the AR apparatus presents, via the mobile device, an indicator that the real estate property is subject to a real estate listing. Generally, the indicator is displayed on the mobile device display. In some embodiments, the indicator is superimposed over the real-time video stream that is captured by the mobile device. The indicator may be any color and it may be any shape. In some embodiments of the invention, the indicator appears as a solid line that surrounds the real estate property displayed on the mobile device display. In other embodiments, the indicator may be semi-transparent and appear on top of the real estate property displayed on the mobile device display.

In the embodiment of the invention described at block 260, the indicator is selectable. Thus, in such embodiments, the user may "select" the indicator and retrieve information related to the subject real estate property. This is shown in block 265.

At block 265, the user selects the indicator to obtain information about the subject real estate property. According to the invention, selecting the indicator displays any type of additional information about the subject real estate property on the mobile device display. In some embodiments of the invention, selecting the indicator displays information about: the specifications on the real estate property, photos of the real estate property, Multiple Listing Service (MLS) information, applicable comparisons to other real estate properties, the listed price of the subject real estate property, tax record data for the subject real estate property and/or the like. In some embodiments, the indicator provides an internet hyperlink to enable the user to obtain further information about the subject real estate property.

Referring now to FIG. 3, a system 300 is illustrated for presenting information associated with a real estate listing in an AR environment. As illustrated, system 300 includes network 320, an AR apparatus 330, and a mobile device 312. FIG. 3 also shows a mobile device user 310 (sometimes referred to herein as user 310) and an image 340. The AR apparatus 330 generally includes a processor 334 communicably coupled to such devices as a memory 336 and communication interface 332.

The processor 334 and other processors described herein may generally include circuitry for implementing communication and/or logic functions of the AR apparatus 330. For example, the processor 334 may include a digital signal processor device, a microprocessor device, and various analog to digital converters, digital to analog converters, and/or other support circuits. Control and signal processing functions of the AR apparatus 330 may be allocated between these devices according to their respective capabilities. The processor 334 thus may also include the functionality to encode and interleave messages and data prior to modulation and transmission. The processor 334 may additionally include an internal data modem. Further, the processor 334 may include functionality to operate one or more software programs or applications, which may be stored as computer-readable code in the memory 336.

In some embodiments, the processor 334 may also be capable of operating one or more applications, such as one or more applications functioning as an artificial intelligence ("AI") engine. The processor 334 may recognize objects that it has identified in prior uses by way of the AI engine. In this way, the processor 334 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or AR apparatus, an indication that the object may be the same object previously recognized. In this regard, the AI engine may provide a baseline or starting point from which to determine the nature of the object. In other embodiments, the AI engine's recognition of an object is accepted as the final recognition of the object.

The processor 334 may be configured to use the communication interface 332 to communicate with one or more other devices on a network. The processor 334 may be configured to provide signals to and receive signals from the communication interface 332. In some embodiments, the signals may include signaling information in accordance with the air interface standard of the applicable cellular system of the wireless telephone network that may be part of the network. In this regard, the AR apparatus 330 may be configured to operate with one or more air interface standards, communication protocols, modulation types, and access types. For example, the AR apparatus 330 may be configured to operate in accordance with second-generation (2G) wireless communication protocols, third-generation (3G) wireless communication protocols, fourth-generation (4G) wireless communication protocols, and/or the like. The AR apparatus 330 may also be configured to operate in accordance with non-cellular communication mechanisms, such as via a wireless local area network (WLAN), global area network (GAN), a wide-area network (WAN), the Internet, and/or other communication/data networks.

As further illustrated in FIG. 3, the AR apparatus 330 includes the memory 336. In some embodiments, the memory 336 contains an object recognition application 339 and AR presentation application 337. Object recognition application 339 and AR presentation application 337 include computer code that, when executed by the processor 334, perform one or more of the AR functions described herein in relation to the AR apparatus 330. In some embodiments, object recognition application 339 is configured to perform the process described in relation to blocks 120 and 130 of FIG. 1 and AR presentation application 337 is configured to perform the process described in relation to block 140 of FIG. 1. The memory 336 also includes data stored therein, such as the identifying data 338. The AR apparatus 330 may be maintained by a financial institution, bank, third-party service provider, and/or any other entity that wishes to provide the functionality described herein. In other embodiments, AR apparatus 330 or portions thereof may be incorporated into mobile device 312.

As indicated in FIG. 3, the network 320 may include one or more telephone networks (e.g., cellular networks, CDMA networks, any wireline and/or wireless network over which communications to telephones and/or mobile phones are sent), local area networks (LANs), wide area networks (WANs), global area networks (GANs) (e.g., the Internet), and/or one or more other telecommunications networks. For example, in some embodiments, the network 320 includes a telephone network (e.g., for communicating with the mobile device 312). It will also be understood that the network 320 may be secure and/or unsecure and may also include wireless and/or wireline technology. In some embodiments, the network 320 is a wireless network.

In this embodiment, the image 340 is an image generated and/or captured by the mobile device 312. In some embodiments, the image 340 shows the field of view of the mobile device 312. It will be understood that the image 340 may be a still image and/or an image that is part of a real-time video stream captured by the mobile device 312 (e.g., by a digital camera and/or video recorder of the mobile device 312). In this embodiment, the image 340 shows Real Estate Property X 342, Real Estate Property Y 344 and Real Estate Property Z 346. In some embodiments, the mobile device user 310 uses the mobile device 312 and the AR apparatus 330 to determine if Real Estate Properties X-Y 342-346 are subject to a real estate listing. In some embodiments, Real Estate Properties X-Z 342-346 are real estate properties. However, in other embodiments, Real Estate Properties X-Z 342-346 are any physical object that may exist within the mobile device's field of view.

In this embodiment, the mobile device 312 may be any mobile device configured to provide and/or participate in the presentation of information associated with a real estate listing in an augmented reality environment, including, for example, a mobile phone, personal digital assistant (PDA), a mobile Internet accessing device, pager, mobile television, portable gaming device, laptop or tablet computer, camera, video recorder, audio/video player, radio, GPS device, and/or the like. As shown in FIG. 3 and FIG. 4, the mobile device 312 may generally include a processor 410 communicably coupled to such devices as a memory 420, user output devices 440B, user input devices 440A, a communication interface 460, a power source 415, a clock or other timer 450, a camera 470, and positioning system device 475.

As shown in FIG. 4, which is a more detailed illustration of mobile device 312, in some embodiments, the camera 470 is a digital camera configured to capture still images. In other embodiments, the camera 470 is a digital video recorder configured to capture a real-time video stream. In other embodiments, the camera 470 embodies both digital camera functionality and digital video functionality. The processor 410 (and other processors described herein) may generally include circuitry for implementing communication and/or logic functions of the mobile device 312. For example, the processor 410 may include a digital signal processor device, a microprocessor device, and various analog to digital converters, digital to analog converters, and/or other support circuits. Control and signal processing functions of the mobile device 312 may be allocated between these devices according to their respective capabilities. The processor 410 thus may also include the functionality to encode and interleave messages and data prior to modulation and transmission. The processor 410 may additionally include an internal data modem. Further, the processor 410 may include functionality to operate one or more software programs or applications, which may be stored in the memory 420. For example, the processor 410 may be capable of operating a connectivity program, such as a web browser application 422. The web browser application 422 may then allow the mobile device 312 to transmit and receive web content, such as, for example, location-based content and/or other web page content, according to a Wireless Application Protocol (WAP), Hypertext Transfer Protocol (HTTP), and/or the like.

The processor 410 may also be capable of operating applications, such as an AR application 421. The AR application 421 may be downloaded from a server and stored in the memory 420 of the mobile device 312. In other embodiments, the AR application 421 may be pre-installed on the memory 420. In some embodiments, the AR 421 application consists of computer-readable code that when executed by the processor 410 provides the AR functionality described herein with regards to the mobile device 312.

The processor 410 may be configured to use the communication interface 460 to communicate with one or more other devices on a network. In this regard, the communication interface 460 may include an antenna 476 operatively coupled to a transmitter 474 and a receiver 472 (together a "transceiver"). The processor 410 may be configured to provide signals to and receive signals from the transmitter 474 and the receiver 472, respectively. The signals may include signaling information in accordance with the air interface standard of the applicable cellular system of the wireless telephone network that may be part of the network. In this regard, the mobile device 312 may be configured to operate with one or more air interface standards, communication protocols, modulation types, and access types. In some embodiments, the mobile device 312 may be configured to operate in accordance with second-generation (2G) wireless communication protocols, third-generation (3G) wireless communication protocols, and/or fourth-generation (4G) wireless communication protocols, and/or the like. The mobile device 312 may also be configured to operate in accordance with non-cellular communication mechanisms, such as via a WLAN, WAN, GAN, the Internet and/or other communication/data networks.

As described above, the mobile device 312 may have a user interface 440 that includes user output devices 440B and/or user input devices 440A. The user output devices 440B may include a display 434 (e.g., a liquid crystal display (LCD) or the like) and a speaker 432 or other audio device, which are operatively coupled to the processor 410. The user input devices 440A, which may allow the mobile device 312 to receive data from the user 310, may include any of a number of devices allowing the mobile device 312 to receive data from a user, such as a keypad, keyboard, touch-screen, touchpad, microphone, mouse, joystick, other pointer device, button, soft key, and/or other input device(s).

The mobile device 312 may further include a power source 415. Generally, the power source 415 is a device that supplies electrical energy to an electrical load. In one embodiment, the power source 415 may convert a form of energy such as solar energy, chemical energy, mechanical energy, etc. to electrical energy. Generally, the power source 415 in the mobile device 312 may be a battery, such as a lithium battery, a nickel-metal hydride battery, or the like, that is used for powering various circuits, e.g., the transceiver circuit, and other devices that are used to operate the mobile device 312. Alternatively, the power source 415 may be a power adapter that can connect a power supply from a power outlet to the mobile device 312. In such embodiments, a power adapter may be classified as a power source "in" the mobile device.

The mobile device 312 may also include a memory 420 operatively coupled to the processor 410. As used herein, memory may include any computer readable medium configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory may additionally or alternatively include an electrically erasable programmable read-only memory (EEPROM), flash memory or the like.

The memory 420 may store any of a number of applications or programs which include computer-executable instructions/code executed by the processor 410 to implement the functions of the mobile device 312 described herein. For example, the memory 420 may include such applications as an AR application 421, a web browser application 422, an SMS application, an email application 424, etc. Although not depicted in FIG. 4, in some embodiments of the invention, the memory 420 may store all or part of object recognition application 339, AR presentation application 337, and the identifying data 338.

Referring now to FIG. 5, a mobile device 500 is provided for presenting information associated with a real estate listing in an augmented reality environment, in accordance with an embodiment of the present invention. In some embodiments, the mobile device 500 shown in FIG. 5 is the mobile device 312 shown in FIG. 3 and FIG. 4. As shown in FIG. 5, the mobile device 500 includes a user input device 540A and a display 540B. The display 540B shows an image 510 captured by the mobile device 500. It will be understood that the image 540 may be a still image or an image from a real-time video stream.

In this embodiment, the image 510 shows Real Estate Property A 542, Real Estate Property B 544, and Real Estate Property C 546. Real Estate Properties A-C 542-546 are located in a row. For example, the user of the mobile device (not shown) may be located on a sidewalk and may use the mobile device 500 in accordance with one or more (or all) portions of the process flows described in FIG. 1 and/or FIG. 2 to determine if any of Real Estate Properties A-C 542-546 are subject to a real estate listing.

FIG. 5 also illustrates the box indicators 520, which are displayed in the display 540B of the mobile device 500 and superimposed over the image 510. In this embodiment, the box indicators 520 surround Real Estate Property A 542 and Real Estate Property B 544 to indicate that Real Estate Property A 542 and Real Estate Property B 544 are subject to real estate listings. Also shown in FIG. 5 is an "X" indicator 522. In this embodiment, the "X" indicator 522 is displayed in the display 540B of the mobile device 500, superimposed over the image 510, and indicates that Real Estate Property C 546 is not subject to a real estate listing.

It will be understood that the box indicators 520 and the "X" indicator 522 may be one or more separate and/or different colors. In this embodiment, the box indicators 520 are depicted as dashed lines that surround Real Estate Property A 342 and Real Estate Property B 344. However, in other embodiments of the invention, the box indicators 520 may be any other shape or size.

FIG. 5 also illustrates a loan offer 530 shown in the display 540B of the mobile device 500. As shown, the loan offer 530 is an offer to the user of the mobile device 500 to take out a loan to purchase Real Estate Property B 544. In some embodiments of the invention, the loan offer is presented by a financial institution associated with the user of the mobile device 500. In other embodiments, the loan offer is presented by a financial institution associated with the owner of Real Estate Property B 544. In some embodiments, the loan offer 530 is offered to the user of the mobile device 500 depending on the user's interest in Real Estate Property B 544. In some embodiments, the loan offer 530 is offered to the user of mobile device 500 if the user remains in the proximity of Real Estate Property B 544 for more than a predetermined amount of time, as measured by the amount of time that Real Estate Property B 544 is shown on the display 540B of the mobile device 500. The loan offer 530 features a selectable icon 575 that enables the user of the mobile device 500 to close the loan offer 530. The selectable icon 575 may be any shape, size, and/or color.

Along with the loan offer 530 the display 540B of the mobile device 500 may also provide real-time interactions with financial analysts, with lawyers advising of the purchase or lease of the real estate, with the financial institution offering financing, etc. The display 540B may further provide a reverse auction for the purchaser. For example, an individual may indication that he wants to purchase a specific home, a reverse auction may be able to provide the individual with several financial institution and/or broker offerings for financing in which the individual may select.

In some embodiments, the box indicators 520 and/or the "X" indicator 522 are selectable (e.g., by a user of the mobile device 500) to provide additional information relating to the real estate properties to which those indicators correspond. For example, FIG. 6 illustrates a pop-up window 602, which appears on the display 540B of the mobile device 500 when the mobile device user selects the selectable box indicator 520 associated Real Estate Property B 544. As shown, in this embodiment, the window 602 includes information about Real Estate Property B 544, such as a specifications 606 of Real Estate Property B 544, MLS information 608 of Real Estate Property B 544, one or more comparisons 610 of Real Estate Property B 544, a listed price 612 of Real Estate Property B 544, the tax record data 614 of Real Estate Property B 544, and/or comments link 616 for Real Estate Property B 544. The information contained in window 602 concerning Real Estate Property B 344 may come from any source, including third party websites, third-party submitted content, communications with a social network, and/or the user of the mobile device 500. In some embodiments, the window 602 may include any other information, text, and/or hyperlinks related to Real Estate Property B 544. Also as shown in FIG. 6, the window 602 may include a selectable icon 604, which upon being selected by the user, closes window 602. The selectable icon 604 may be any shape, size, and/or color.

In this embodiment, the window 602 is displayed in the display 540B of the mobile device 500 and is positioned on top of (e.g., superimposed over) the image 510. Of course, it will be understood that the window 602 and/or the information contained therein may be presented in other ways. For instance, in some embodiments, the information included in window 602 may appear integrated into the display 540B of the mobile device 500, such that the information does not cover up any of the image 510. In other embodiments, the window 602 and/or the information contained within may take up all or part of the display 540B of the mobile device 500. In some other embodiments, where the indicator 520 is not selectable, the information contained within window 602 may be displayed to the user on the display 540B without the user having to select any portion of the display 540B.

As illustrated in FIG. 6 and described above, the window 602 contains information about Real Estate Property B 544. The specifications 606 may include information about the physical specifications of Real Estate Property B 544 (e.g., square footage, lot size, the original builder, number of rooms, etc.). The MLS information 608 may include any MLS, or Multiple Listing Service information about Real Estate Property B 544. The comparisons 610 may include any comparisons of Real Estate Property B 544 to other real estate properties within a predetermined distance from Real Estate Property B 544. In some embodiments, the predetermined distance is variable by the user. The listing price 612 displays the listing price of Real Estate Property B 544. In some embodiments of the invention, the listing price 612 may include historical listing price information for Real Estate Property B 544. The tax record data 614 may include any tax record data for Real Estate Property B 544. Lastly, in some embodiments, comments link 616 includes one or more hyperlinks that prompt the mobile device user to capture either still images and/or video of the exterior or interior of Real Estate Property B 544 using the mobile device 500. In some embodiments, comments link 616 includes one or more hyperlinks that prompt the mobile device user to log comments about Real Estate Property B 544 into an associated real estate logbook or the like. Further, in some embodiments, comments link 616 includes one or more hyperlinks that prompt the mobile device user to communicate the still images, video, and/or comments to an individual associated with the user of mobile device (e.g., a friend or family member) via email, text message, and/or the like.

Referring now to FIG. 7, a mixed block and flow diagram of a system 700 is provided for presenting information associated with a real estate listing in an augmented reality environment. In general terms, FIG. 7 illustrates an embodiment of the invention where a user uses a mobile phone 701 to capture a real-time video stream of a real estate property, "House #1", to determine whether House #1 is for sale. It will be understood that the mobile phone 701 is accessible to the user referred to in block 702. In some embodiments, the user may activate an AR application stored on the mobile phone 701 to perform one or more of the functions represented in FIG. 7. Further, it will be understood that the system 700 illustrated in FIG. 7 represents an embodiment of the process flow 100 described in connection with FIG. 1. As shown, the system 700 includes a mobile phone 701 and an AR apparatus 703. In some embodiments, the AR apparatus 703 and/or the mobile phone 701 each include a communication interface, a processor, and memory, which may contain an application and/or data, and those components may be operatively connected to each other.

In accordance with some embodiments, the AR apparatus 703 and the mobile phone 701 are operably and selectively connected to each over via one or more networks (not shown). The one or more networks may include telephone networks (e.g., cellular networks, CDMA networks, any wireline and/or wireless network over which communications to telephones and/or mobile phones are sent), local area networks (LANs), wide area networks (WANs), global area networks (GANs) (e.g., the Internet), and/or one or more other networks.

At block 702, the user approaches House #1. In some embodiments, the user approaches House #1 on foot and in other embodiments, the user approaches House #1 via a vehicle. In some embodiments, the user parks and/or stops a vehicle on the street in front of House #1.

After approaching House #1, the user points the mobile phone 701 at House #1. The user points the mobile phone 701 such that House #1 is within the field of view of the mobile phone 701 digital video recorder. Since House #1 is within the field of view of the mobile phone 701 digital video recorder, the user captures a real-time video stream of House #1.

At block 704, the mobile phone transmits GPS coordinates and directional information to AR apparatus 703. The GPS coordinates and directional information provide an indication of the physical location and orientation of the mobile phone 701 when it captured the real-time video stream of House #1. The mobile phone 701 transmits this information using a communication interface in the mobile phone 701 via a network, which may comprise a telephone network (e.g., cellular networks, CDMA networks, any wireline and/or wireless network over which communications to telephones and/or mobile phones are sent), local area network (LANs), wide area network (WANs), global area network (GANs) (e.g., the Internet), and/or one or more other telecommunications networks. At block 706, the AR apparatus 706 receives the GPS coordinates and directional information, via a communication interface.

At block 708, the AR apparatus 703 uses the GPS coordinates and directional information to identify House #1. In some embodiments, the AR apparatus 703 identifies House #1 by determining which direction the mobile phone 701 was facing when it captured the real-time video stream of House #1. By determining the direction in which the mobile phone 701 was facing, the AR apparatus 703 can identify the real property that was captured by the real-time video stream at block 702, i.e., House #1. In some embodiments, AR apparatus 703 also identifies House #1 by House #1's street address.

Further, at block 710, the AR Apparatus 703 determines that House 190 1 is subject to a real estate listing in which House #1 is listed "For Sale." The AR Apparatus 703 may use various methods to determine that House #1 is subject to a real estate listing. In one embodiment, AR apparatus 703 compares the identified street address of House #1 to addresses of known real estate properties that are subject to a real estate listing.

At block 712, the AR apparatus 703 notifies the mobile phone 701 that House #1 is subject to a real estate listing. In one embodiment, the AR apparatus 703 notifies the mobile phone 701 over the network by using the communication interface of AR apparatus 703. At block 714, the mobile phone 701 determines whether it is still capturing a real-time video stream of House #1. In some embodiments, the mobile phone 701 compares the GPS coordinates and directional information that the mobile phone 701 previously transmitted at block 704 to the GPS coordinates and direction information that describe the location and orientation of the mobile phone 701 at block 714. If the GPS coordinates and direction information are the same, then the mobile phone 701 determines that it is still capturing a real-time video stream of House #1. As one of skill in the art will appreciate, the mobile phone 701 may use many different methods to determine if it is still capturing a real-time video stream of House #1. If the mobile phone 701 determines that it is still capturing a real-time video stream of House #1, then the process flow proceeds to block 716.

At block 716, the mobile phone 701 generates and/or displays an indicator that indicates that House #1 is subject to a "For Sale" real estate listing. The indicator is displayed on the display of the mobile phone 701 and is superimposed over the current real-time video stream of House #1 (as determined in block 714) that is captured by the mobile phone 701. The indicator may be any color, size, and/or shape. For example, in some embodiments, the indicator appears as a solid, green line that surrounds House #1 that is shown on the display of the mobile phone 701.

Although not described in relation to FIG. 7, one of ordinary skill in the art will appreciate that the presentation of information associated with a real estate listing in an augmented reality environment may be embodied in many different forms and should not be construed as limited to the embodiment or embodiments set forth in relation to FIG. 7. For instance, in some embodiments, the process flow of FIG. 7 may be achieved through the use of only a mobile phone (e.g., the mobile phone 701). In some of those embodiments, the functionality of AR apparatus 703 may be incorporated into mobile phone 701. Additionally, in some embodiments, the AR apparatus 703 and/or the mobile phone 701 may generate and/or display an indicator that is (i) contained in a still image of a real estate property and/or (ii) indicates that the real estate property is not subject to a real estate listing.

In various embodiments, information associated with or related to one or more objects that is retrieved for presentation to a user via the mobile device may be permanently or semi-permanently associated with the object. In other words, the object may be "tagged" with the information. In some embodiments, a location pointer is associated with an object after information is retrieved regarding the object. In this regard, subsequent mobile devices capturing the object for recognition may retrieve the associated information, tags and/or pointers in order to more quickly retrieve information regarding the object. In some embodiments, the mobile device provides the user an opportunity to post messages, links to information or the like and associate such postings with the object. Subsequent users may then be presenting such postings when their mobile devices capture and recognize an object. In some embodiments, the information gathered through the recognition and information retrieval process may be posted by the user in association with the object. Such tags and/or postings may be stored in a predetermined memory and/or database for ease of searching and retrieval.

In general terms, although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method implemented by a computing device, wherein the computing device determines whether a real estate property is subject to a real estate listing, the method comprising:
    receiving positioning information from a mobile device, wherein the positioning information is associated with a real-time video stream being captured by the mobile device;
    identifying, based at least partially on the positioning information, the real estate property;
    determining if the real estate property is subject to a real estate listing;
    presenting, on the mobile device, information about the real estate listing;
    presenting, on the mobile device, a graphical indication of whether the real estate property is subject to the real estate listing; and
    superimposing, over the real-time video stream being captured by the mobile device, the graphical indication of whether the real estate property is subject to the real estate listing.

2. The method of claim 1, wherein receiving positioning information comprises receiving Global Positioning System (GPS) coordinates.

3. The method of claim 1, wherein receiving positioning information comprises receiving directional information.

4. The method of claim 1, wherein receiving positioning information comprises receiving information associated with an image.

5. The method of claim 4, wherein receiving information associated with an image comprises receiving the image.

6. The method of claim 1, wherein identifying, based at least partially on the positioning information, a real estate property comprises identifying the address of a real estate property.

7. The method of claim 1, wherein determining if the real estate property is subject to a real estate listing comprises comparing the address of the real estate property to an address associated with a real estate listing.

8. The method of claim 1, wherein the method further comprises the step of displaying, on a display of the mobile device, real estate property specifications.

9. The method of claim 1, wherein the method further comprises the step of displaying, on a display of the mobile device, Multiple Listing Service information.

10. The method of claim 1, wherein the method further comprises the step of displaying, on a display of the mobile device, real estate property comparisons.

11. The method of claim 1, wherein the method further comprises the step of displaying, on a display of the mobile device, the listed price of the real estate property.

12. The method of claim 1, wherein the method further comprises the step of displaying, on a display of the mobile device, tax record information of the real estate property.

13. The method of claim 1, further comprising:
    presenting, via the mobile device, an offer to take out a loan to purchase the real estate property.

14. The method of claim 1, further comprising:
    determining that the mobile device is capturing the real-time video stream that shows the real estate property before presenting, via the mobile device, the information about the real estate listing.

15. The method of claim 1, wherein presenting the graphical indication of whether the real estate property is subject to the real estate listing comprises presenting an indicator that can be selected by a user of the mobile device to display information about the real estate property.

16. The method of claim 1, further comprising:
    compiling a database of real estate listings.

17. An apparatus for determining whether a real estate property is subject to a real estate listing, wherein the apparatus comprises:
    a communication device; and
    a processing device communicably coupled to the communication device, wherein the processing device is configured to:
    receive positioning information from a mobile device, wherein the positioning information is associated with a real-time video stream being captured by the mobile device;
    identify, based at least partially on the positioning information, the real estate property;
    determine if the real estate property is subject to the real estate listing;
    present, on the mobile device, information about the real estate listing;
    present, on the mobile device, a graphical indication of whether the real estate property is subject to the real estate listing; and
    superimpose, over the real-time video stream being captured by the mobile device, the graphical indication of whether the real estate property is subject to the real estate listing.

18. The apparatus of claim 17, wherein the positioning information comprises Global Positioning System (GPS) coordinates.

19. The apparatus of claim 17, wherein the positioning information comprises directional information.

20. The apparatus of claim 17, wherein the positioning information comprises information associated with an image.

21. The apparatus of claim 20, wherein the information associated with an image comprises the image.

22. The apparatus of claim 17, wherein the processor is further configured to identify the address of the real estate property.

23. The apparatus of claim 17, wherein the processor is further comprised to compare the address of the real estate property to an address associated with a real estate listing.

24. The apparatus of claim 17, wherein the processor is further configured to display, on a display of the mobile device, real estate property specifications.

25. The apparatus of claim 17, wherein the processor is further configured to display, on a display of the mobile device, Multiple Listing Service information.

26. The apparatus of claim 17, wherein the processor is further configured to display, on a display of the mobile device, real estate property comparisons.

27. The apparatus of claim 17, wherein the processor is further configured to display, on a display of the mobile device, the listed price of the real estate property.

28. The apparatus of claim 17, wherein the processor is further configured to display, on a display of the mobile device, tax record information of the real estate property.

29. The apparatus of claim 17, wherein the processor is further configured to present, via the mobile device, an offer to take out a loan to purchase the real estate property.

30. The apparatus of claim 17, where in the processor is further configured to determine that the mobile device is capturing the real-time video stream that shows the real estate property before presenting the information about the real estate listing.

31. The apparatus of claim 17, wherein the graphical indication of whether the real estate property is subject to the real estate listing comprises an indicator that can be selected by a user of the mobile device to display information about the real estate property.

32. The apparatus of claim 17, wherein the processor is further configured to compile a database of real estate listings.

33. A computer program product for determining whether a real estate property is subject to a real estate listing, the computer program product comprising a non-transitory computer-readable medium, wherein the non-transitory computer-readable medium comprises computer executable program code stored therein, the computer-executable program code comprising:
a first executable portion configured for receiving positioning information from a mobile device, wherein the positioning information is associated with a real-time video stream being captured by the mobile device;
a second executable portion configured for identifying, based at least partially on the positioning information, the real estate property;
a third executable portion configured for determining if the real estate property is subject to the real estate listing; and
a fourth executable portion configured for presenting information about the real estate listing, presenting a graphical indication of whether the real estate property is subject to the real estate listing, and superimposing, over the real-time video stream being captured by the mobile device, the graphical indication of whether the real estate property is subject to the real estate listing.

34. The computer program product of claim 33, wherein the positioning information comprises Global Positioning System (GPS) coordinates.

35. The computer program product of claim 33, wherein the positioning information comprises directional information.

36. The computer program product of claim 33, wherein the positioning information comprises information associated with an image.

37. The computer program product of claim 36, wherein the information associated with an image comprises the image.

38. The computer program product of claim 33, wherein identifying, based at least partially on the positioning information, a real estate property comprises identifying the address of the real estate property.

39. The computer program product of claim 33, wherein determining if the real estate property is subject to a real estate listing comprises comparing the address of the real estate property to an address associated with a real estate listing.

40. The computer program product of claim 33, further comprising a fifth executable portion configured for displaying, on a display of the mobile device, real estate property specifications.

41. The computer program product of claim 33, further comprising a fifth executable portion configured for displaying, on a display of the mobile device, Multiple Listing Service information.

42. The computer program product of claim 33, further comprising a fifth executable portion configured for displaying, on a display of the mobile 43. The computer program product of claim 33, further comprising a fifth executable portion configured for displaying, on a display of the mobile device, tax record information of the real estate property.

44. The computer program product of claim 33, further comprising a fifth executable portion configured for displaying, on a display of the mobile device, the listed price of the real estate property.

45. The computer program product of claim 33, wherein the computer-executable program code further comprises a fifth executable portion configured for presenting an offer to take out a loan to purchase the real estate property.

46. The computer program product of claim 33, wherein the computer-executable program code further comprises a fifth executable portion configured for determining that the mobile device is capturing the real-time video stream that shows the real estate property before presenting the information about the real estate listing.

47. The computer program product of claim 33, wherein the graphical indication of whether the real estate property is subject to the real estate listing comprises an indicator that can be selected by a user of the mobile device to display information about the real estate property.

48. The computer program product of claim 33, wherein the computer-executable program code further comprises a fifth executable portion configured for compiling a database of real estate listings.

* * * * *

UNITED STATES PATENT AND TRADEMARK OFFICE
CERTIFICATE OF CORRECTION

| | | |
|---|---|---|
| PATENT NO. | : 8,718,612 B2 | Page 1 of 1 |
| APPLICATION NO. | : 13/342045 | |
| DATED | : May 6, 2014 | |
| INVENTOR(S) | : Matthew A. Calman et al. | |

It is certified that error appears in the above-identified patent and that said Letters Patent is hereby corrected as shown below:

Title page, item [73] should read as follows:

---Bank of America---

Signed and Sealed this
Second Day of December, 2014

Michelle K. Lee
*Deputy Director of the United States Patent and Trademark Office*